Sept. 30, 1958   J. R. MOWERY, JR   2,854,613
MOTOR CONTROL SYSTEM
Filed Jan. 15, 1957
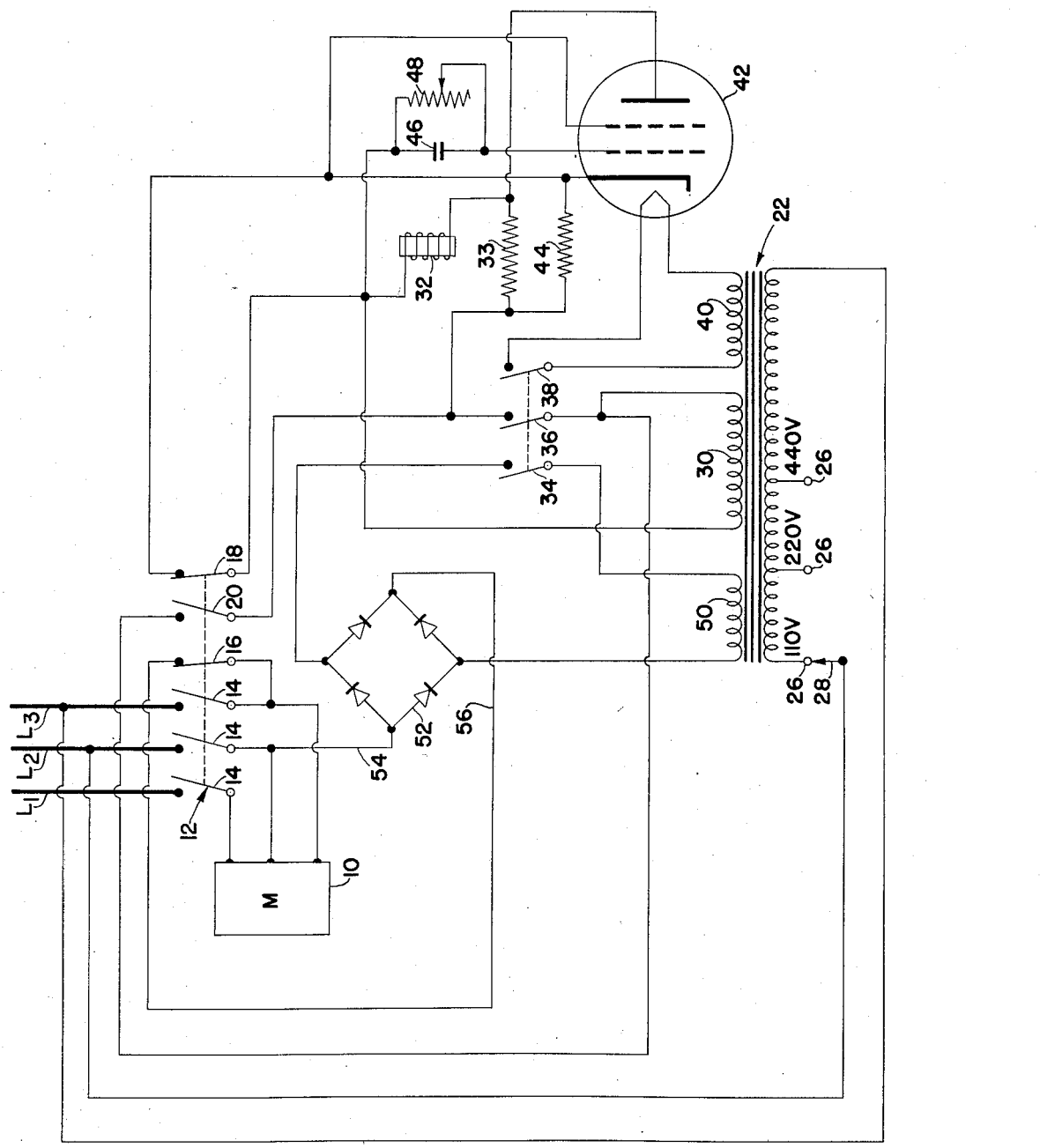
INVENTOR
JESSE R. MOWERY, JR.
BY
ATTORNEY

United States Patent Office 2,854,613
Patented Sept. 30, 1958

2,854,613

MOTOR CONTROL SYSTEM

Jesse R. Mowery, Lancaster, Pa., assignor, by mesne assignments, to American Machine & Foundry Company, a corporation of New Jersey Application January 15, 1957, Serial No. 634,319

7 Claims. (Cl. 318—212)

This invention relates to motor control systems and, more particularly to improvements in systems in which an alternating current motor is dynamically braked by the application of D. C. to its windings.

This invention relates to a braking system of the type shown in my copending application Serial Number 457,665. In many motor braking applications, it is desirable not only to set accurately the time delay period during which direct current is applied to the motor winding after the motor has been removed from the A. C. power source, but it is further desirable to be able to easily and quickly vary this time delay period. Furthermore, it is preferable that the braking system be adaptable for use with any selected value of motor operating voltage without the necessity of changing or substituting major components of the braking system.

It is therefore an object of the present invention to provide a novel motor control system.

It is another object of the invention to provide a system for dynamically braking an A. C. motor by the application of D. C. to its windings having quickly adjustable means for varying the timing period during which the D. C. is applied.

For a better understanding of the invention, together with other and further objects thereof, reference is made to the following detailed description taken in connection with the accompanying drawing, in which a schematic circuit diagram of an embodiment of the invention is shown.

Referring now to the drawing, power lines L1, L2, L3 supply three-phase voltage to a three-phase motor, generally indicated as 10, through normally open switch contacts 14 of a switch generally indicated as 12. It will be understood that switch 12 may be a contactor or relay which may be actuated by a separate control circuit if desired; but, for purposes of illustration, switch 12 is shown as a manually operated switch. The motor is started by closing contacts 14. Switch 12 also has normally closed contacts 16, 18 and normally open contacts 20, all of which are ganged together and operate in ganged relation with contacts 14.

A transformer 22 has a winding 24 with selectable taps 26 and is connected to lines L2 and L3. By selecting an appropriate tap 26 with a switch 28, the braking system may be quickly and easily adjusted for any of the usual values of line voltage which may be applied to the motor with which it is adapted to be used. Although the braking system is illustrated in use with a three-phase motor, it is understood that it may be easily employed in a single phase system.

Closing of switch 12 also closes normally open contacts 20 which, in turn, apply the voltage developed across windings 30 of transformer 22 to a relay coil 32 through a resistor 33. When relay 32 is thus energized, associated normally open contacts 34, 36, 38 are closed thereby applying a voltage from winding 40 through contacts 38 of relay 32 to the filaments of a gas discharge valve 42. The voltage developed across winding 30 of transformer 22 is also applied between the control grid and cathode of gas discharge valve 42 through serially connected switch contacts 36 and a resistor 44. A capacitor 46, and adjustable grid leak resistor 48 connected in parallel therewith, is connected in series with the winding 30 and control electrode of valve 42.

It will be seen that the energization of relay 32 also causes the voltage developed by winding 30 of transformer 22 to be applied to the control electrode of gas discharge valve 42 so that due to the self-rectifying action of the valve 42, condenser 46 is charged to a predetermined voltage.

The anode of valve 42 is connected to the junction point between relay 32 and resistor 33. Resistor 33 has a relatively low value and in one embodiment of the invention, a value of 200 ohms was found to be satisfactory. Cathode bias resistor 44 has a relatively high value, for example, 22,000 ohms, so that gas discharge tube 42 is supplied with a cathode bias sufficiently high to prevent inadvertent firing. Gas discharge valve 42 may be a thyratron, or any gas type valve, which is adapted to pass a very heavy current between its cathode and anode when its control grid receives a voltage sufficiently high to cause it to lose control.

Energization of relay 32 also completes a circuit between winding 50 of transformer 22 and a bridge-connected rectifier 52, through switch 34, so that a D. C. voltage suitable for braking purposes is developed between lines 54 and 56. However, the D. C. voltage is not applied to the windings of motor 10 as long as contacts 14 are closed inasmuch as normally closed contact 16 is open at that time. When contacts 14 of switch 12 are opened, thereby removing motor 10 from lines L1, L2, L3, the D. C. voltage developed between lines 54, 56 is applied to the windings of motor 10 through closed contact 16 of switch 12, thereby causing the motor to stop within a fraction of the time normally needed when the motor is allowed to coast to a stop.

The D. C. voltage developed by winding 50 and rectifier 52 is applied to the motor for the period of time initiated when ganged contact 18 closes upon the opening of contacts 14, and ended when gas discharge valve 42 conducts.

Although contacts 20 are opened during the braking period, relay 32 remains energized through holding contacts 36 connected in parallel with contacts 20. Closing of contacts 18 connects the cathode of valve 42 directly to the junction point between winding 30 and capacitor 46, thereby allowing capacitor 46 to discharge through adjustable resistor 48 and eventually assume the same potential as the cathode of the gas discharge valve 42. As soon as this condition is met, the control grid of valve 42 loses control and allows a heavy current to pass between the anode and cathode so that relay coil 32 is effectively shorted out. Thereupon contacts 34, 36 and 38 open and remove the holding circuit for relay 32 and also the D. C. from windings of motor 10.

It will be seen that a time delay period is thus provided for application of D. C. voltage to the windings of motor 10, which period is dependent upon the time required for capacitor 46 to discharge and allow gas discharge valve 42 to fire. This time delay period may be easily varied by either changing the size of the capacitor 46 or adjusting the sliding contact of variable grid resistor 48.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

What is claimed is:

1. In combination with an electric motor, a source of supply of A. C. voltage, switch means connecting said motor to said A. C. source, a voltage converter having an A. C. input and a D. C. output and adapted to be energized by said A. C. source, contact means operatively associated with said switch means for connecting said D. C. output to said motor when said motor is disconnected from said A. C. source, and time delay means for deenergizing said voltage converter at a predetermined time after said contact means are operated, said time delay means comprising relay means including associated contacts serially connected between said A. C. source and said voltage converter input and operative to energize said converter, a gas discharge device connected in shunt with said relay, said discharge device having an associated timing circuit operative in response to the deenergization of said motor for firing said gas discharge device after a predetermined period to incapacitate said relay means, whereby said associated contacts open and deenergize said voltage converter to effectively remove said D. C. from said motor.

2. In combination with an electric motor, a source of supply of A. C. voltage, switch means connecting said motor to said A. C. source, a voltage converter having an A. C. input and a D. C. output, and adapted to be energized by said A. C. source, contact means operatively associated with said switch means for connecting said D. C. output to said motor when said motor is disconnected from said A. C. source, and time delay means for deenergizing said voltage converter at a predetermined time after said contact means are operated, said time delay means comprising circuit interrpting means serially connected between said A. C. source and said voltage converter input, a gas discharge device adapted to actuate said circuit interrupting means, and a timing circuit operative in response to the deenergization of said motor for firing said gas discharge device after a predetermined period of time to cause said discharge device to actuate said interrupting means.

3. The invention defined in claim 1 wherein said timing circuit includes a resistance-capacitance time constant circuit connected to the control electrode of said discharge device.

4. The invention defined in claim 3 wherein said timing circuit includes means for charging said time constant circuit when said motor is energized and discharging said time constant circuit when said motor is deenergized, said gas discharge device being adapted to fire when said time constant circuit is discharged.

5. In combination with an electric motor, a source of supply of A. C. voltage, switch means connecting said motor to said A. C. source, a voltage converter having an A. C. input and a D. C. output and adapted to be energized by said A. C. source, contact means operatively associated with said switch means for connecting said D. C. output to said motor when said motor is disconnected from said A. C. source, and time delay means for deenergizing said voltage converter at a predetermined time after said contact means are operated, said time delay means comprising relay means including associated contacts serially connected between said A. C. source and said voltage converter input, and operative to energize said converter, a self-holding circuit for said relay operative to hold said relay in an energized condition after said motor has been deenergized, a gas discharge device connected in shunt with said relay, said discharge device having an associated timing circuit operative in response to the deenergization of said motor for firing said gas discharge device after a predetermined period to incapacitate said relay means, whereby said holding circuit is released.

6. The invention defined in claim 3 wherein said discharge device has at least an anode, a cathode, and a control electrode, and said time constant circuit is connected to said control electrode and a source of charging voltage, said time constant circuit including a pair of contacts actuated by said motor switch means when said motor is deenergized to connect said time constant circuit to said cathode whereby said discharge device is fired when said capacitor is discharged.

7. In combination with an electric motor, a source of supply of A. C. voltage, switch means connecting said motor to said A. C. source, a voltage converter having an A. C. input and a D. C. output and adapted to be energized by said A. C. source, contact means operatively associated with said switch means for connecting said D. C. output to said motor when said motor is disconnected from said A. C. source, and time delay means for deenergizing said voltage converter at a predetermined time after said contact means are operated, said time delay means comprising relay means having a pair of terminals and including associated contacts serially connected between said A. C. source and said voltage converter input and operative to energize said converter, a self-holding circuit for said relay operative to hold said relay in an energized condition after said motor has been deenergized, a gas discharge device having at least an anode, a cathode and a control grid, said anode being connected to one terminal of said relay, said cathode being connected to said second terminal of said relay when said motor is disconnected from said A. C. source, and a timing circuit connected to said control electrode and operative in response to the disconnection of said motor from said A. C. source for firing said gas discharge device after a predetermined period to short out said relay means whereby said holding circuit is released.

No references cited.